United States Patent [19]

Kleeberg et al.

[11] 4,072,804
[45] Feb. 7, 1978

[54] CROSS-LINKABLE EPOXY RESIN CASTING COMPOUNDS

[75] Inventors: Wolfgang Kleeberg, Erlangen; Heinz Hacker; Klaus-Robert Hauschildt, both of Nurnberg, all of Germany

[73] Assignee: Siemens Aktiengesellschaft, Munich, Germany

[21] Appl. No.: 617,234

[22] Filed: Sept. 26, 1975

[30] Foreign Application Priority Data

Sept. 30, 1974 Germany .............................. 2446697

[51] Int. Cl.$^2$ .............................................. C08G 59/42
[52] U.S. Cl. ............................... 526/11.2; 260/47 EP; 260/47 EC; 260/47 EA; 260/78.41; 260/836
[58] Field of Search ........ 260/47 EP, 47 EC, 47 UA, 260/78.4 EP, 78.5 BB, 78.4 E, 837 R, 836; 526/11.2

[56] References Cited

U.S. PATENT DOCUMENTS

| | | | |
|---|---|---|---|
| 3,450,613 | 6/1969 | Steinberg | 204/159.15 |
| 3,637,618 | 1/1972 | May | 260/837 R |
| 3,720,592 | 3/1973 | Mani | 204/159.15 |
| 3,736,289 | 5/1973 | Marshall | 260/837 R |
| 3,847,769 | 11/1974 | Garratt et al. | 204/159.22 |
| 3,932,556 | 1/1976 | Takamori et al. | 260/836 |

FOREIGN PATENT DOCUMENTS 2,205,925  8/1973  Germany.

Primary Examiner—Harold D. Anderson
Assistant Examiner—Earl A. Nielsen
Attorney, Agent, or Firm—Kenyon & Kenyon, Reilly, Carr & Chapin

[57] ABSTRACT

The invention provides epoxy resin casting compounds based on polyepoxides, polycarboxylic acids and/or polycarboxylic acid anhydrides with directly or latently present carboxyl functions, which can be converted by polyaddition and/or polymerization into insoluble and unmeltable cross-linked polymers. According to the invention, the carboxyl functions are replaced, at least partially, by maleic acid monoallyl ester and a polymerization-initiating radical former, the maleic acid monoallyl ester component being present in the reaction mixture in free form and/or in the form of adducts to the polyepoxide. The epoxy resin casting compounds constitute systems which can be processed in a wide temperature range and are cross-linked rapidly at elevated temperature.

14 Claims, No Drawings

CROSS-LINKABLE EPOXY RESIN CASTING COMPOUNDS

BACKGROUND OF THE INVENTION

The invention concerns epoxy resin casting compounds based on polyepoxides, polycarboxylic acids and/or polycarboxylic acid anhydrides with directly or latently present carboxyl functions, which can be converted by polyaddition and/or polymerization into insoluble and unmeltable cross-linked polymer materials and which may optionally contain fillers and other additives.

It is known, and much effort has been spent, to prepare cross-linked polymers from castable mixtures of monomers or from castable mixtures of monomers and pre-polymers which contain polymerizable carbon double bonds as well as epoxy functions and components which can be added to them, such as, for instance, dicarboxylic acids or dicarboxylic acid anhydrides. It was essentially the aim of these efforts to create more economically processable and less expensive casting compounds than those purely on an epoxy resin polyadduct base. However, cross-linked polymers on the above-mentioned base have up to now not found any substantial technical application. The reasons for this are, the limitations of the processing technique, e.g., the relatively high vapor pressure of inexpensive polymerizable monomers such as styrene, vinyl toluol and methylmethacrylate; the relatively high viscosity of unsaturated prepolymers such as unsaturated polyester resins; the low rate of polymerization and the fact that allyl monomers can be only reacted completely under uneconomical reaction conditions (high temperature and a long reaction time); the low storage stability and poor control and management of the cross-linking reaction such as, for instance, in the case of monoallylitaconate; or because of excessive volume reduction during the cross-linking reaction. Other reasons for the infrequent technical application of the above-mentioned casting compounds are the level of their mechanical-thermal properties, which is lower than with epoxy casting compounds, and their usually lower chemical-thermal stability.

It is further known that adducts of maleic acid monoallyl esters to polyepoxy compounds with a low acid number and a low epoxy number can be converted by peroxide-initiated polymerization into thermally stable, cross-linked polymers, which are preferably suited as a resin matrix for composite materals (cf. German Offenlegungsschrift No. 2,205,925, page 3, paragraph 2, to page 4, paragraph 2).

SUMMARY OF THE INVENTION

It is an object of the invention, particularly in view of processing epoxy resin casting compounds analogously to injection molding, to create systems on the basis of polyepoxides and carboxyl-functional addition components which can be processed in a wide range of temperatures and can be cross-linked quickly at elevated temperature, where the cross-linked systems preferably exhibit a solidification temperature above 100° C. Such epoxy resin casting compounds are of interest in electrical engineering for the fabrication of molded insulating bodies or encapsulation particularly if economical processability and a well-balanced level of mechanical-thermal and electrical properties can be achieved in the cross-linked state.

According to the invention, this is achieved by replacing the directly or latently present carboxyl functions, at least partially, by maleic acid monoallyl esters and a polymerization-initiating radical former, where the maleic acid monoallyl ester component is present in the processable mixture; (a) as such; or (b) in the form of adducts to the polyepoxide; or (c) in a combination of (a) and (b).

The polymer materials according to the invention are mainly suited for the fabrication of electrically molded insulating bodies or for encapsulations.

According to present experience with systems which can be cross-linked by polymerizable carbon double bonds and by epoxy functions and carboxy-functional components that can be added to these, it was not clearly predictable that, using maleic acid monoallyl ester as a component with polymerizable carbon double bonds, technically valuable products could be obtained, under conditions for cross-linking which permit a great latitude for processing and a high cross-linking speed at temperatures above the solidification temperature of the cross-linking system.

It was, in particular, not predictable that the partial replacement of carboxy-functional addition components by maleic acid monoallyl esters leads, via a complex cross-linking cycle which is initiated by peroxide or accelerated by tertiary amines, to molding materials that are distinctly superior to epoxy resins which are conventionally cross-linked with dicarboxylic acid anhydrides, as far as their mechanical-thermal level is concerned. It is possible, without appreciable shift of the solidification temperature interval of the polymer lattice produced, to clearly increase its mechanical strength as expressed by its flexible strength, and its mechanical energy absorption capacity as expressed by the impact resistance of conventional standard test specimens. Thus, a new approach to cross-linked casting resin molding materials has been discovered in this invention whose increased energy absorbing capacity under mechanical stress is not achieved, by so-called flexibilization and thereby a distinct shift of the solidification temperature interval toward lower temperatures.

The low viscosity of the maleic acid monoallyl ester ($\eta = 27.8$ cP at 20° C) facilitates the processing of the casting resin system according to the invention and permits under some circumstances higher contents of inorganic fillers than are possible with corresponding, casting resin systems based only on epoxy and carboxyl functional components. Through the use of maleic acid monoallyl ester as a component which can be cross-linked by peroxide initiation and can be built into a lattice generated by a reaction of epoxide and carboxyl via its carboxyl function, one can therefore combine the initial economic advantage of a higher filler content with the advantage of better removal of the exothermic reaction heat without adverse effects on the level of mechanical-thermal properties as compared with corresponding casting resin systems without maleic acid monoallyl esters. Thereby, particularly advances in the economical processing of epoxy casting resin systems analogous to injection molding becomes possible.

The high boiling point (theoretically above 400° C, 1 bar) of the maleic acid monoallyl ester prevents evaporation losses, which must otherwise be tolerated with other low-boiling comonomers.

One can further allow the polymerization and the polyaddition to proceed simultaneously or, if desired, sequentially by measures which are known to those skilled in the art, such as the choice of suitable accelerators for the epoxy polyaddition or the choice of suitable peroxide initiators for the maleic allylester copolymerization, so that the total reaction heat developed is developed in a narrow or a wider temperature range for a given volume of casting resin and a given heating rate.

There is no limitation as to the choice of polyepoxy compounds, dicarboxylic acids and/or dicarboxylic acid anhydrides employing the maleic acid monoallyl esters as the lattice-building component.

The epoxy resin casting compounds according to the invention can be processed economically and, are particularly suited for processes analogous to injection molding. The molding materials obtained after the cross-linking have a distinctly higher level of mechanical properties, the solidification temperature interval being the same, than corresponding molding materials of an epoxy resin polyadduct. Thus, the cross-linkable epoxy resin casting compounds are used to particular advantage for the manufacture of electrically insulating molded bodies and encapsulations such as, for example, pin insulators for inside and outdoor use which can be highly stressed electrically and mechanically.

The invention will be further illustrated by the following examples.

The mechanical and thermal property data cited in the examples were measured exclusively on standard bars 120 × 15 × 10 mm.

The maleic acid monoallyl esters used are preferably prepared in accordance with the method in German Offenlegungsschrift No. 2,205,911 (page 1, last paragraph, to page 2, first paragraph) and by the method proposed in German patent application No. P 24 46 660.2 at page 4 now German Offenlegungsschrift No. 2,446,660. The examples show comparisons of measured property data of the molding materials prepared from casting compounds according to the present invention with property data of comparable, partly standardized casting resin molding materials and demonstrate the considerably higher overall level of use properties of the molding materials made from the casting resin compounds according to the invention.

EXAMPLE 1

Exactly 100 parts by weight of the monoaduct of maleic acid monoallyl ester to triglycidylisocyanurate (Epoxy Number = 0.415) are mixed homogeneously, while being stirred, with 30 parts by weight maleic acid monoallyl ester and 30 parts by weight hexahydrophthalic acid anhydride, at 80° C. Thereupon, 2 g dicumylperoxide and 0.5 g N,N-dimethylbenzylamine are added. The homogeneous casting resin compound was, degassed for 5 min at 1 Torr and 80° C and then poured into molds preheated to 80° C. Conditions of cross-linking were: 1 hr at 80° C, 1 hr at 120° C and 1 hr at 150° C, after which it was removed from the mold. The post-cross-linking of the casting resin moldings took place for 1 hr at 200° C and 3 hrs at 220° C. This casting resin molding material (No. 1) prepared in this manner has the property data listed in Table 1.

For comparison, Table 1 also shows the level of properties of a molding material (No. 2), which was prepared in a known manner from 100 parts by weight triglycidyliso-cyanurate and 140 parts by weight hexahydrophthalic acid anhydride. Conditions of cross-linking were: 1 hr at 120° C, 16 hrs at 150° C and 5 hrs at 220° C.

Table 1

| Property | Test Specification | Measured Data Moldg. Mat. No. 1 | Moldg. Mat. No. 2 |
|---|---|---|---|
| Flexible Strength N/mm² | DIN 53 452 | 159,6 | 107,5 |
| Impact Strength N.mm/mm² | DIN 53 453 | 19,4 | 9,8 |
| Deflection mm | DIN 53 452 | 5 | 5,5 |
| Thermal Deformation Resistance (Martens) °C | DIN 53 458 | 206 | 201 |
| $T_E = \Lambda_{max}$ °C | DIN 53 445 DIN 7 724 | >240 | >240 |

EXAMPLE 2

Exactly 100 parts by weight of the monoadduct of maleic acid monoallyl ester to triglycidylisocyanurate (Epoxy Number = 0.415) was mixed homogeneously, while being stirred, with 61 parts by weight of hexahydrophthalic acid anhydride, at 80° C. Then 2 g dicumylperoxide and 0.5 g dimethylbenzylamine were added. The homogenous casting resin compound was degassed for 5 min at 1 Torr and 80° C and subsequently poured into molds preheated to 80° C. Conditions of cross-linking: 1 hr at 80° C, 1 hr at 120° C and 1 hr at 150° C, then removal from mold. The post-cross-linking of the casting resin moldings took place during 3 hrs at 200° C.

The casting resin molding material (No. 3), prepared in this manner, exhibits the property data listed in Table 2. For comparison, the property data of the casting resin molding material (No. 4), prepared from 100 parts by weight tryglycidylisocyanurate and 140 parts by weight hexahydrophthalic acid anhydride (conditions of cross-linking: 1 hr at 120° C, 16 hrs at 150° C and 5 hrs at 220° C) are also listed.

Table 2

| Property | Test Specification | Measured Data Moldg. Mat. No. 3 | Moldg. Mat. No. 4 |
|---|---|---|---|
| Flexible Strength N/mm² | DIN 53 452 | 137,6 | 107,5 |
| Impact Strength N.mm/mm² | DIN 53 453 | 15,3 | 9,8 |
| Deflection mm | DIN 53 452 | 5,5 | 5,5 |
| Thermal Deformation Resistance (Martens) °C | DIN 53 458 | 191 | 201 |
| $T_E = \Lambda_{max}$ °C | DIN 53 445 DIN 7 724 | >240 | >240 |

EXAMPLE 3

About 100 parts by weight of a maleic acid monoallyl ester bisadduct to triglycidylisocyanurate (Epoxy Number = 0.150) were mixed homogeneously at 100° C, while being stirred, with 22 parts by weight maleic acid monoallyl ester. Then 2 g dicumylperoxide and 0.5 g dimethylbenzylamine were added to the mixture. The homogeneous casting resin compound formed was degassed for 5 min at 1 Torr and 100° C and subsequently poured into molds preheated at 100° C. Conditions of cross-linking were: 1 hr at 100° C, 3 hrs at 120° C and 1 hr at 150° C; after which it was removed from the mold. The post-cross-linking of the casting resin molding took place for 2 hours at 220° C. The casting resin molding material (No. 5) prepared in this manner exhibits the property data listed in Table 3. For comparison, the property data of casting resin molding material (No. 4) from Example 2 are also included.

Table 3

| Property | Test Specification | Measured Data Moldg. Mat. No. 5 | Moldg. Mat. No. 4 |
|---|---|---|---|
| Flexible Strength N/mm² | DIN 53 452 | 148,2 | 107,5 |
| Impact Strength N.mm/mm² | DIN 53 453 | 10,3 | 9,8 |
| Deflection mm | DIN 53 452 | 4,8 | 5,5 |
| Thermal Deformation Resistance (Martens) °C | DIN 53 458 | 212 | 201 |
| $T_E = \Lambda_{max_\circ} C$ | DIN 53 445 DIN 7 724 | >240 | >240 |

EXAMPLE 4

Exactly 100 parts by weight 1,3-bis-(1-glycidyl-hydantoin-3-yl)-propyl-2-glycidyl ether (commercially available as Araldit XB 2818) with Epoxy Number = 0.570 was mixed homogeneously at 80° C, while being stirred, with 28 parts by weight of maleic acid monoallyl ester. Thereupon, 60 parts by weight methyl-hexahydrophthalic acid anhydride, 2 g dicumylperoxide and 0.5 g dimethylbenzylamine are admixed. The homogeneous casting resin compound was degassed for 5 min at 1 Torr and 80° C and subsequently poured into molds preheated to 80° C. Setting: 1 hr at 80° C, 2 hrs at 120° C and 1 hr at 150° C; then, removal from the mold. Post-cross-linking of the casting resin moldings: 3 hrs at 180° C.

The casting resin molding material (No. 6) prepared in this manner exhibits the property data listed in Table 4. For comparison, the property data of the casting resin molding material (No. 7), prepared from 100 parts by weight Araldit XB 2818 and 90 parts by weight methyl-hexahydrophthalic acid anhydride as well as 1 part by weight dimethylbenzylamine, are also included. Conditions of cross-linking: 1 hr at 100° C 16 hrs at 150° C.

Table 4

| Property | Test Specification | Measured Data Moldg. Mat. No. 6 | Moldg. Mat. No. 7 |
|---|---|---|---|
| Flexible Strength N/mm² | DIN 53 452 | 164,0 | 104,2 |
| Impact Strength N.mm/mm² | DIN 53 453 | >30,0 | 13,1 |
| Deflection mm | DIN 53 452 | 8,7 | 5,1 |
| Thermal Deformation Resistance (Martens) °C | DIN 53 458 | 140 | 151 |
| $T_E = \Lambda_{max_\circ} C$ | DIN 53 445 DIN 7 724 | 180 | 185 |

EXAMPLE 5

Exactly 100 parts by weight of the monoadduct of maleic acid monoallyl ester to 1,3-bis-(1-glycidylhydantoin-3-yl)-propyl-2-glycidyl ether with EZ = 0.278 was mixed homogeneously at 100° C, while being stirred, with 41 parts by weight of maleic acid monoallyl ester. Then 2 g dicumylperoxide and 0.5 g dimethylbenzylamine were added to the mixture. The homogeneous casting resin compound was degassed for 5 min at 1 Torr and 100° C and subsequently poured into molds preheated to 100° C. Conditions of cross-linking: 1 hr at 100° C, 2 hrs at 120° C and 3 hrs at 150° C; then removal from mold. The post-cross-linking took place during 3 hrs at 200° C. the casting resin molding material (No. 8) prepared in this manner has the property data listed in Table 5. For comparison, the casting resin molding material (No. 7) of Example 4 is included.

Table 5

| Property | Test Specification | Measured Data Moldg. Mat. No. 8 | Moldg. Mat. No. 7 |
|---|---|---|---|
| Flexible Strength N/mm² | DIN 53 452 | 160,8 | 104,2 |
| Impact Strength N.mm/mm² | DIN 53 453 | 22,0 | 13,1 |
| Deflection mm | DIN 53 452 | 6,3 | 5,1 |
| Thermal Deformation Resistance (Martens) °C | DIN 53 458 | 137 | 151 |
| $T_E = \Lambda_{max_\circ} C$ | DIN 53 445 DIN 7 724 | 190 | 185 |

EXAMPLE 6

Exactly 100 parts by weight of the monoadduct of maleic acid monoallyl ester to 1,3-bis-(1-glycidylhydantoin-3-yl)-propyl-2-glycidyl ether with Epoxy Number = 0.278 was mixed homogeneously at 100° C, while being stirred, with 20 parts by weight of maleic acid monoallyl ester and 20 parts by weight hexahydrophthalic acid anhydride. Then 2 g dicumylperoxide and 0.5 g dimethylbenzylamine were added. The homogeneous casting resin compound was degassed for 5 min at 1 Torr and 100° C and subsequently poured into molds preheated to 100° C. Conditions of cross-linking: 1 hr at 100° C, 2 hrs at 120° C and 1 hr at 150° C; followed by removal from mold. The post-cross-linking of the casting resin moldings took place during 3 hrs at 200° C.

The casting resin molding material (No. 9) prepared in this manner exhibits the property data listed in Table 6. For comparison, the property data of the casting resin molding material (No. 7) of Example 4 are also shown.

Table 6

| Property | Test Specification | Measured Data Moldg. Mat. No. 9 | Moldg. Mat. No. 7 |
|---|---|---|---|
| Flexible Strength N/mm² | DIN 53 452 | 165,0 | 104,2 |
| Impact Strength N.mm/mm² | DIN 53 453 | 16,1 | 13,1 |
| Deflection mm | DIN 53 452 | 7,5 | 5,1 |
| Thermal Deformation Resistance (Martens) °C | DIN 53 458 | 139 | 151 |
| $T_E = \Lambda_{max_\circ} C$ | DIN 53 445 DIN 7 724 | 193 | 185 |

EXAMPLE 7

Exactly 100 parts by weight of an epoxy resin based on cyclohexane-dicarboxylic acid glycidyl ester (commercially available as Araldit CY 183) with Epoxy Number = 0.586 was mixed homogeneously at 90° C, while being stirred, with 43 parts by weight of maleic acid monoallyl ester and 41 parts by weight methylhexahydrophthalic acid anhydride. Then 2 g dicumylperoxide and 0.5 g dimethylbenzylamine were added. The homogeneous casting resin compound was degassed for 5 min at 1 Torr and 90° C and was applied subsequently into molds preheated to 100° C. The original viscosity was 70 cP at 90° C. Conditions of cross-linking: 1 hr at 100° C, 1 hr at 120° C and 1 hr at 150° C; with removal from the mold. The post-cross-linking of the casting resin moldings took place for 2 hrs at 150° C.

The casting resin molding material (No. 10) exhibits the property data listed in Table 7. For comparison, the property data of the casting resin molding material (No. 11), prepared from 100 parts by weight hexahydrophthalic acid bisglycidyl ester, Epoxy Number = 0.586, and 100 parts by weight methylhexahydrophthalic acid anhydride as well as 2 parts by weight dimethylbenzylamine, are listed. Setting: 4 hrs at 80° C.

Table 7

| Property | Test Specification | Measured Data Moldg. Mat. No. 10 | Moldg. Mat. No. 11 |
|---|---|---|---|
| Flexible Strength N/mm$^2$ | DIN 53 452 | 142,7 | 136,0 |
| Impact Strength N.mm/mm$^2$ | DIN 53 453 | 20,6 | 26,0 |
| Deflection mm | DIN 53 452 | 7,3 | 8,0 |
| Thermal Deformation Resistance (Martens) °C | DIN 53 458 | 106 | 100 |
| $T_E = \Lambda_{max_o}$ °C | DIN 53 445 DIN 7 724 | 155 | 126 |

EXAMPLE 8

Exactly 100 parts by weight of a bisphenolA-bisglycidyl ether with Epoxy Number = 0.577 was mixed homogeneously at 100° C, while being stirred, with 43 parts by weight monoallylmaleate and 41 parts by weight phthalic acid anhydride. Then 2 g dicumylperoxide and 0.5 g dimethylbenzylamine were added. The homogeneous casting resin compound was degassed for 5 min at 1 Torr and 100° C and subsequently processed in molds preheated to 100° C. The original viscosity was 16 cP at 100° C. The cross-linking conditions are 1 hr at 100° C and 2 hrs at 120° C; then removal from the mold. The post-cross-linking of the casting resin moldings took place during 2 hrs at 150° C.

The casting resin molding material (No. 12) prepared in this manner exhibits the property data listed in Table 8. For comparison, the Table contains the property data of the casting resin molding material Type FS 1000-0 according to DIN 16946.

Table 8

| Property | Test Specification | Measured Data Moldg. Mat. No. 12 | Moldg. Mat. No. 11 |
|---|---|---|---|
| Flexible Strength N/mm$^2$ | DIN 53 452 | 158.1 | 135 - 145 |
| Impact Strength N.mm/mm$^2$ | DIN 53 453 | 19.0 | 20 - 28 |
| Deflection mm | DIN 53 452 | 10 | 13 - 15 |
| Thermal Deformation Resistance (Martens) °C | DIN 53 458 | 94 | 95 - 105 |
| $T_E = \Lambda_{max_o}$ °C | DIN 53 445 DIN 7 724 | 145 | 133 |

EXAMPLE 9

Exactly 100 parts by weight 1-glycidyl-3-β-glycidyloxypropyl-5,5-dimethylhydantoin (commercially available as Araldit XB 2793; Epoxy Number = 0.653), was mixed homogeneously at 90° C, while being stirred, with 48 parts by weight maleic acid monoallyl ester and 48 parts by weight hexahydrophthalic acid anhydride. Then 2 g dicumylperoxide and 0.5 g dimethylbenzylamine was added. The homogeneous casting resin compound was degassed for 5 min at 1 Torr and 100° C and subsequently processed in molds preheated to 90° C. The original viscosity was 50 cP at 90° C. Conditions of cross-linking: 1 hr at 90° C, 1 hr at 100° C and 1 hr at 120° C; then, removal from mold. Post-cross-linking: 2 hrs at 150° C.

The casting resin molding material (No. 13) prepared in this manner exhibits the property data listed in Table 9. For comparison, the property data of the casting resin molding material (No. 14), prepared from 100 parts by weight Araldit XB 2793 and 100 parts by weight hexahydrophthalic acid anhydride as well as 1 part by weight of accelerator with a 1-methylimidazole base mixed with multi-valent hydroxyl compounds (LMB 1263 of CIBA-GEIGY AG, Basle), are also given in the Table. Cross-linking: 6 hrs at 100° C, 10 hrs at 140° C.

Table 9

| Property | Test Specification | Measured Data Moldg. Mat. No. 13 | Moldg. Mat. No. 14 |
|---|---|---|---|
| Flexible Strength N/mm$^2$ | DIN 53 452 | 146.7 | 133.7 |
| Impact Strength N.mm/mm$^2$ | DIN 53 453 | 20.4 | 8.5 |
| Deflection mm | DIN 53 452 | 5.8 | — |
| Thermal Deformation Resistance (Martens) °C | DIN 53 458 | 119 | 134 |
| $T_E = \Lambda_{max_o}$ °C | DIN 53 445 DIN 7 724 | 155 | 170 |

EXAMPLE 10

Exactly 100 parts by weight of an epoxy resin with 3,4 epoxycyclohexylmethyl-3,4-epoxycyclohexane carboxylate base (commercially available as Araldit CY 179) with Epoxy Number = 0.71 was mixed homogeneously at 80° C, while being stirred, with 52 parts by weight maleic acid monoallyl ester and 52 parts by weight hexahydrophthalic acid anhydride. Then 2 g dicumylperoxide and 5 g accelerator DY 065 were added. The homogeneous casting resin compound was degassed for 5 min at 1 Torr and 80° C and subsequently poured into molds preheated to 100° C. Conditions of cross-linking: 2 hrs at 100° C, 2 hrs at 120° C; then, removal from mold. Post-cross-linking of the casting resin moldings: 2 hrs at 150° C.

The casting resin molding material (No. 15) prepared in this manner exhibits the property data listed in Table 10. For comparison are listed the property data of casting resin molding material (No. 16), prepared from 100 parts by weight Araldit CY 179, 105 parts by weight hexahydrophthalic acid anyhdride and 12 parts by weight accelerator (Na hexylate, e.g., accelerator DY 065 of CIBA-GEIGY AG, Basle). Cross-linking: 5 hrs at 80° C, 6 hrs at 140° C.

Table 10

| Property | Test Specification | Measured Data Moldg. Mat. No. 15 | Moldg. Mat. No. 16 |
|---|---|---|---|
| Flexible Strength N/mm$^2$ | DIN 53 452 | 152.0 | 120.0 |
| Impact Strength N.mm/mm$^2$ | DIN 53 453 | 15.0 | 10.0 |
| Deflection mm | DIN 53 452 | 3 | 7 |
| Thermal Deforma- | DIN 53 458 | 140 | 150 |

Table 10-continued

| Property | Test Specification | Measured Data | |
|---|---|---|---|
| | | Moldg. Mat. No. 15 | Moldg. Mat. No. 16 |
| tion Resistance (Martens) °C | | | |

EXAMPLE 11

Exactly 100 parts by weight of the monoaduct of maleic acid monoallyl ester to tryglycidylisocyanurate, Epoxy Number = 0.415, were mixed homogeneously at 90° C, while being stirred, with 30 parts by weight maleic acid monoallyl ester and 30 parts by weight hexahydrophthalic acid anhydride. Then 250 g of dried, preheated (90° C) quartz powder (W 12 of the firm Quarzwerke GmbH, Cologne) were mixed in. Subsequently, 2 g dicumylperoxide and 0.5 g N,N-dimethylbenzylamine are added. The homogeneous casting resin compound was degassed for 5 min at 1 Torr and 90° C and then placed in molds preheated to 100° C. Cross-linking: 1 hr at 100° C, 1 hr at 120° C and 1 hr at 150° C; followed by removal from the mold. The post-cross-linking of the casting resin moldings took place during 1 hr at 200° C and 3 hrs at 220° C.

The casting resin molding material (No. 17) prepared in this manner exhibits the property data listed in Table 11. For comparison, the property data of the casting resin molding material Type FS 1000-6 according to DIN 16 946 are also listed.

Table 11

| Property | Test Specification | Measured Data | |
|---|---|---|---|
| | | Moldg. Mat. No. 17 | Moldg. Mat. FS1000 |
| Flexible Strength N/mm² | DIN 53 452 | 139,9 | 130 – 150 |
| Impact Strength N.mm/mm² | DIN 53 453 | 15,0 | 11 – 16 |
| Thermal Deformation Resistance (Martens) °C | DIN 53 458 | >240 | 110 – 120 |
| Leakage Resistance Class | DIN 53 480 | KA 3 c | KA 2 |
| Arc Resistance Class | DIN 53 484 | L 3 | L 1 – L 2 |
| Burn Characteristic Class | VDE 0304 | II b | — |

EXAMPLE 12

Exactly 100 parts by weight 1,3-bis-(1-glycidylhydantoin-3-yl)propyl-2-glycidyl ether with an Epoxy Number of 0.57 was mixed homogeneously at 90° C, while being stirred, with 28 parts by weight maleic acid monoallyl ester and 60 parts by weight methylhexahydrophthalic acid anhydride. Then, 350 of dried, preheated (90° C) quartz powder (W 12 of the firm Quarzwerke GmbH, Cologne), was added. Subsequently, 2 g dicumylperoxide and 0.5 g N,N-dimethylbenzylamine were added. The homogenous casting resin compound was degassed for 5 min at 1 Torr and 90° C and then placed in molds preheated to 100° C. Cross-linking conditions: 1 hr at 100° C, 1 hr at 120° C and 1 hr at 150° C; then, removal from the mold. The post-cross-linking took place during 3 hrs at 200° C.

The casting resin molding material (No. 18) prepared in this manner exhibits the property data listed in Table 12. For comparison, the property data of the casting resin molding material Type FS 1000-6 according to DIN 16 946 are listed.

Table 12

| Property | Test Specification | Measured Data | |
|---|---|---|---|
| | | Moldg. Mat. No. 18 | Moldg. Mat. FS1000-6 |
| Flexible Strength N/mm² | DIN 53 452 | 143.8 | 130 – 150 |
| Impact Strength N.mm/mm² | DIN 53 453 | 13.4 | 11 – 16 |
| Thermal Deformation Resistance (Martens) °C | DIN 53 458 | 170 | 110 – 120 |
| Leakage Resistance Class | DIN 53 480 | KA 3 c | KA 2 |
| Arc Resistance Class | DIN 53 484 | L 3 | L 1 – L 2 |

EXAMPLE 13

Exactly 100 parts by weight of a hexahydrophthalic acid bisglycidyl ester with an Epoxy Number of 0.586 was mixed homogeneously at 90° C, while being stirred, with 43 parts by weight maleic acid monoallyl ester and 41 parts by weight methylhexahydrophthalic acid anhydride. After mixing in 330 g of dried, preheated (90° C) quartz powder (W 12 of the firm Quarzwerke GmbH, Cologne), 2 g dicumylperoxide and 0.5 g N,N-dimethylbenzylamine were also added. The homogeneous casting resin compound was degassed for 5 min at 1 Torr and 90° C and subsequently poured into the molds preheated to 100° C. Cross-linking conditions: 1 hr at 100° C, 2 hrs at 120° C; then, removal from mold. The post-cross-linking of the casting resin moldings took place during 3 hrs at 150° C.

The casting resin molding material (No. 19) prepared in this manner exhibits the property data listed in Table 13. For comparison, the property data of the casting resin molding material Type FS 1000-6 according to DIN 16 946 are also listed in the table.

Table 13

| Property | Test Specification | Measured Data | |
|---|---|---|---|
| | | Moldg. Mat. No. 19 | Moldg. Mat. FS1000-6 |
| Flexible Strength N/mm² | DIN 53 452 | 145.8 | 130 – 150 |
| Impact Strength N.mm/mm² | DIN 53 453 | 15.5 | 11 – 16 |
| Thermal Deformation Resistance (Martens) °C | DIN 53 458 | 117 | 110 – 120 |
| Leakage Resistance Class | DIN 53 480 | KA 3 c | KA 2 |
| Arc Resistance Class | DIN 53 484 | L 3 | L 1 – L 2 |
| Burn Characteristic Class | VDE 0304 | II b | — |

EXAMPLE 14

Exactly 100 parts by weight of a bisphenol-A-bis-glycidyl ether with an Epoxy Number of 0.577 was mixed homogeneously at 90° C, while being stirred, with 43 parts by weight maleic acid monoallyl ester and 41 parts by weight methylhexahydrophthalic acid anhydride. After adding 350 g dried, preheated (90° C) quartz powder (W 12 of the firm Quarzwerke, GmbH, Cologne), 2 g dicumylperoxide and 0.5 g N,N-dimethylbenzylamine were mixed in. The homogeneous casting resin compound was degassed for 5 min at 1 Torr and 90° C and then poured into molds preheated to 100° C.

Cross-linking conditions: 1 hr at 100° C, 1 hr at 120° C and 1 hr at 150° C; then, removal from the mold.

The post-cross-linking of the casting resin moldings took place during 3 hrs at 150° C.

The casting resin molding material (No. 20) prepared in this manner exhibits the property data listed in Table 14. For comparison, the property data of the casting resin molding material Type FS 1000-6 according to DIN 16 946 are also listed in the table.

Table 14

| Property | Test Specification | Measured Data Moldg. Mat. No. 20 | Moldg. Mat. FS1000-6 |
|---|---|---|---|
| Flexible Strength N/mm$^2$ | DIN 53 452 | 158.5 | 130 – 150 |
| Impact Strength N.mm/mm$^2$ | DIN 53 453 | 17.2 | 11 – 16 |
| Thermal Deformation Resistance (Martens) ° C | DIN 53 458 | 116 | 110 – 120 |
| Leakage Resistance Class | DIN 53 480 | KA 3 c | KA 2 |
| Burn Characteristic Class | VDE 0304 | II b | — |

EXAMPLE 15

Exactly 100 parts by weight 1-glycidyl-3-β-glycidyl-propyl-5,5-dimethylhydantoin with Epoxy Number = 0.653 was mixed homogeneously at 90° C, while being stirred, with 48 parts by weight maleic acid monoallyl ester and 48 parts by weight, hexahydrophthalic acid anhydride. After adding 375 g dried, preheated (90° C) quartz powder (W 12 of the firm Quarzwerke GmbH, Cologne), 2 g dicumylperoxide and 0.5 g N,N-dimethylbenzylamine were added. The homogeneous casting resin compound was degassed for 5 min at 1 Torr and 90° C and then poured into molds preheated to 100° C. Cross-linking conditions: 1 hr at 100° C, 2 hrs at 120° C; followed by removal from the mold. The post-cross-linking of the casting resin moldings took place during 3 hrs at 150° C.

The casting resin molding material (No. 21) prepared in this manner exhibits the property data listed in Table 15. For comparison, the property data of the casting resin molding material Type FS 1000-6 according to DIN 16 946 are listed.

Table 15

| Property | Test Specification | Measured Data Moldg. Mat. No. 21 | Moldg. Mat. FS1000-6 |
|---|---|---|---|
| Flexible Strength N/mm$^2$ | DIN 53 452 | 147.5 | 130 – 150 |
| Impact Strength N.mm/mm$^2$ | DIN 53 453 | 12.5 | 11 – 16 |
| Thermal Deformation Resistance (Martens) ° C | DIN 53 458 | 137 | 110 – 120 |
| Leakage Resistance Class | DIN 53 480 | KA 3 c | KA 2 |
| Burn Characteristic Class | VDE 0304 | II b | — |

EXAMPLE 16

Exactly 100 parts by weight of a bisphenol-A-bisglycidyl ethel with Epoxy Number = 0.577 was mixed homogeneously at 90° C, while being stirred, with 43 parts by weight maleic acid monoallyl ester and 41 parts by weight methylhexahydrophthalic acid anhydride. After placing therein 350 g of dried, preheated (90° C) Mikrodol Super of the firm Kurz-Hessenthal KG, 2 g dicumylperoxide and 0.5 g N,N-dimethylbenzylamine were also added. The homogeneous casting compound was degassed for 5 min at 1 Torr and 90° C and subsequently poured into molds preheated to 100° C. Cross-linking conditions: 1 hr at 100° C, 2 hrs at 120° C; then, removal from the mold. The post-cross-linking of the casting resin moldings took place during 3 hrs at 150° C.

The casting resin molding material (No. 22) prepared in this manner exhibits the property data listed in Table 16. For comparison, the property data of the casting resin molding material (No. 23) are listed. This molding material was prepared from 100 parts by weight bisphenol-A-bisglycidyl ester with an Epoxy Number of 0.577, 100 parts by weight hexahydrophthalic acid anhydride, 1 part by weight accelerator N,N-dimethylbenzylamine and 450 parts by weight Mikrodol 20 μm. Cross-linking conditions: 8 hrs at 80° C, 8 hrs at 130° C. (these data were taken from the Technical bulletin of the firm CIBA-GEIGY AG, Basle, Publication No. 31643/2).

Table 16

| Property | Test Specification | Measured Data Moldg. Mat. No. 22 | Moldg. Mat. No. 23 |
|---|---|---|---|
| Flexible Strength N/mm$^2$ | DIN 53 452 | 112.1 | 70.0 |
| Impact Strength N.mm/mm$^2$ | DIN 53 453 | 10.8 | 3.0 |
| Thermal Deformation Resistance (Martens) ° C | DIN 53 458 | 114 | 79 |

EXAMPLE 17

Exactly 100 parts by weight of hexahydrophthalic acid bisglycidyl ester with an Epoxy Number of 0.586 was mixed homogeneously at 90° C, while being stirred, with 43 parts by weight maleic acid monoallyl ester and 41 parts by weight methylhexahydrophthalic acid anhydride. After adding 435 g dried, preheated (90° C) filler (Hydrargillit DT 79 of the firm CIBA-GEIGY AG, Wehr), 2 g dicumylperoxide and 0.5 g N,N-dimethylbenzylamine were added. The casting resin compound was degassed for 5 min at 1 Torr and 90° C and then poured into molds preheated to 100° C. Cross-linking conditions: 1 hr at 100° C and 2 hrs at 120° C; then, removal from the mold. The post-cross-linking took place during 5 hrs at 150° C.

The casting resin molding material (No. 24) prepared in this manner exhibits the property data listed in Table 17. For comparison, the property data of the casting resin molding material (No. 27), prepared from 100 parts by weight hexahydrophthalic acid bisglycidyl ester with an Epoxy Number of 0.586, 100 parts by weight hexahydrophthalic acid anhydride, 6 parts by weight accelerator (Na hexylate) and 380 parts by weight filler DT 079, are also listed. (The data were taken from the Technical Bulletin of the firm CIBA-GEIGY AG, Basle, Publication No. 36241/d).

Table 17

| Property | Test Specification | Measured Data Moldg. Mat No. 24 | Moldg. Mat. No. 27 |
|---|---|---|---|
| Flexible Strength n/mm$^2$ | DIN 53 452 | 95.3 | 60 – 70 |
| Impact Strength N.mm/mm$^2$ | DIN 53 453 | 9.6 | 4 – 5 |

Table 17-continued

| Property | Test Specification | Measured Data | |
| --- | --- | --- | --- |
| | | Moldg. Mat No. 24 | Moldg. Mat. No. 27 |
| Deflection mm | DIN 53 452 | 1.0 | 2 –3 |
| Thermal Deformation Resistance (Martens) °C | DIN 53 458 | 106 | 100 – 110 |

We claim:

1. An epoxy casting composition capable of being converted to insoluble and unmeltable crosslinked polymers by polyaddition and polymerization comprising a mixture of a polyepoxide, a polycarboxyl-containing compound selected from the group consisting of a polycarboxylic acid, a polycarboxylic acid anhydride and mixtures thereof, a polymerization-initiating radical former, and maleic acid monoallyl ester, said ester being present in said mixture as:
   (a) an adduct to said polyepoxide, said adduct containing free epoxy functions; or
   (b) free maleic acid monoallyl ester; or
   (c) a combination of (a) and (b).

2. The epoxy resin casting composition of claim 1 wherein said polyepoxide is triglycidylisocyanurate.

3. The epoxy resin casting composition of claim 1 wherein said polyepoxide is 1,3-bis-(1-glycidyl-hydantoin-3-yl)-propyl-2-glycidyl ether.

4. The epoxy resin casting composition of claim 1 wherein said polyepoxide is cyclohexane-dicarboxylic acid glycidyl ester.

5. The epoxy resin casting composition of claim 1 wherein said polyepoxide is bis-phenolA-biglycidyl ether.

6. The epoxy resin casting composition of claim 1 wherein said polyepoxide is 1-glycidyl-3-$\beta$-glycidyloxy propyl-5,5-dimethylhydantoin.

7. The epoxy resin casting composition of claim 1 wherein said polyepoxide is hexahydrophthalic acid bis glycidyl ester.

8. The epoxy resin casting composition of claim 1 wherein said polyepoxide is 1-glycidyl-3-$\beta$-glycidylpropyl-5,5-dimethylhydantoin.

9. The epoxy resin casting composition of claim 1 wherein said polyepoxide is 3,4-epoxycyclohexylmethyl-3,4-epoxycyclohexane carboxylate.

10. The epoxy resin casting composition of claim 1 wherein said polycarboxylic acid anhydride is hexahydrophthalic acid anhydride.

11. The epoxy resin casting composition of claim 1 wherein said polycarboxylic acid anhydride is methylhexahydrophthalic acid anhydride.

12. The epoxy resin casting composition of claim 1 wherein said polycarboxylic acid anhydride is phthalic acid anhydride.

13. The epoxy resin casting composition of claim 1 which further contains a filler.

14. The epoxy resin casting composition of claim 1 wherein said radical former is dicumylperoxide.

* * * * *